(12) United States Patent
Choi et al.

(10) Patent No.: US 8,961,074 B2
(45) Date of Patent: Feb. 24, 2015

(54) CUTTING TOOL

(75) Inventors: Chang Hee Choi, Daegu (KR); Chang Gyu Park, Daegu (KR)

(73) Assignee: TaeguTec, Ltd., Dalsung-gun, Daegu (KR)

( * ) Notice: Subject to any disclaimer, the term of this patent is extended or adjusted under 35 U.S.C. 154(b) by 915 days.

(21) Appl. No.: 12/094,410

(22) PCT Filed: Nov. 21, 2006

(86) PCT No.: PCT/KR2006/004895
§ 371 (c)(1),
(2), (4) Date: Sep. 4, 2008

(87) PCT Pub. No.: WO2007/058513
PCT Pub. Date: May 24, 2007

(65) Prior Publication Data
US 2009/0148245 A1    Jun. 11, 2009

(30) Foreign Application Priority Data
Nov. 21, 2005  (KR) ................. 10-2005-0111220

(51) Int. Cl.
*B23C 5/22* (2006.01)
*B23C 5/24* (2006.01)
*B23C 5/06* (2006.01)

(52) U.S. Cl.
CPC ............. *B23C 5/2406* (2013.01); *B23C 5/06* (2013.01); *B23C 5/2462* (2013.01); *B23C 5/2472* (2013.01); *B23C 2210/165* (2013.01); *B23C 2222/84* (2013.01)
USPC ............... 407/37; 407/40; 407/45; 407/47

(58) Field of Classification Search
USPC ......... 407/102, 103, 104, 106, 36, 37, 38, 40, 407/41, 44, 45, 87, 86, 92
See application file for complete search history.

(56) References Cited

U.S. PATENT DOCUMENTS 1,089,527 A * 3/1914 Holton ........................ 407/41
2,751,006 A * 6/1956 Lane .............................. 83/674

(Continued)

FOREIGN PATENT DOCUMENTS

| CN | 1020555 C | 5/1993 |
| CN | 1086617 C | 6/2002 |

(Continued)

OTHER PUBLICATIONS

U.S. Appl. No. 12/440,078, filed Mar. 5, 2009, Choi, et al.

*Primary Examiner* — Kenneth E. Peterson
*Assistant Examiner* — Jennifer Swinney
(74) *Attorney, Agent, or Firm* — Womble Carlyle

(57) ABSTRACT

The present invention is directed to a cutting tool, comprising: at least one cutting insert; a tool body including a pocket portion to which the cutting insert is mounted; a means for fixing the cutting insert to the pocket portion of the tool body; and a screw for finely adjusting the position of the cutting insert fixed to the pocket portion of the tool body. The screw has a head portion, a threaded portion and a portion for connecting the head portion to the threaded portion. The pocket portion has a bottom surface with a screw hole formed thereon into which the threaded portion is fastened. It also has a side wall comprising a surface for closely contacting the head portion of the screw. The head portion of the screw closely contacts and resiliently pressurizes the close contact surface of the pocket portion when the threaded portion is fastened into the screw hole.

15 Claims, 6 Drawing Sheets

(56) References Cited

U.S. PATENT DOCUMENTS

| | | | |
|---|---|---|---|
| 2,945,288 A * | 7/1960 | Berry, Jr. | 407/41 |
| 3,102,441 A * | 9/1963 | Milewski | 408/146 |
| 3,116,538 A * | 1/1964 | Severson | 407/41 |
| 3,138,847 A * | 6/1964 | Berry, Jr. | 407/46 |
| 3,176,377 A * | 4/1965 | Milewski | 407/77 |
| 3,195,376 A * | 7/1965 | Bader | 408/146 |
| 3,205,559 A * | 9/1965 | Greenleaf | 407/36 |
| 3,381,553 A * | 5/1968 | Lutz | 408/168 |
| 3,410,160 A * | 11/1968 | Le Barre | 408/153 |
| 3,662,444 A * | 5/1972 | Erkfritz | 407/41 |
| 3,665,571 A * | 5/1972 | Dupuis | 407/103 |
| 3,747,179 A | 7/1973 | Lovendahl | |
| 3,889,330 A * | 6/1975 | Zweekly | 407/103 |
| 4,692,069 A * | 9/1987 | Kieninger | 407/39 |
| 4,869,624 A | 9/1989 | Viellet | |
| 4,938,638 A | 7/1990 | Hessman et al. | |
| 5,102,269 A | 4/1992 | Arai et al. | |
| 5,199,828 A * | 4/1993 | Forsberg et al. | 407/104 |
| 5,209,610 A * | 5/1993 | Arai et al. | 407/36 |
| 5,217,333 A * | 6/1993 | Hunt | 408/181 |
| 5,938,377 A | 8/1999 | Jordberg et al. | |
| 6,050,751 A * | 4/2000 | Hellstrom | 407/104 |
| 6,155,753 A * | 12/2000 | Chang | 407/92 |
| 6,692,198 B2 * | 2/2004 | Kress | 407/36 |
| 6,942,431 B2 * | 9/2005 | Pantzar et al. | 407/40 |
| 7,275,894 B2 * | 10/2007 | Schlagenhauf et al. | 407/37 |
| 2002/0081168 A1 | 6/2002 | Kress | |
| 2003/0031518 A1 | 2/2003 | Hellstrom et al. | |
| 2003/0113173 A1 | 6/2003 | Pantzar et al. | |
| 2005/0254907 A1 * | 11/2005 | Bader et al. | 407/36 |

FOREIGN PATENT DOCUMENTS

| | | | | |
|---|---|---|---|---|
| CN | 1556735 A | | 12/2004 | |
| DE | 3602427 A1 * | | 7/1987 | B23D 77/02 |
| DE | 39 36 243 A1 | | 5/1991 | |
| EP | 111649 A1 * | | 6/1984 | |
| EP | 337970 A1 * | | 10/1989 | |
| EP | 1 314 502 A1 | | 5/2003 | |
| JP | 01171706 A * | | 7/1989 | B23B 27/16 |
| JP | 3-277413 | | 12/1991 | |
| JP | 8-39325 | | 2/1996 | |
| JP | 08039325 A * | | 2/1996 | |
| JP | 2004 90153 | | 3/2004 | |
| KR | 2002-0044078 | | 6/2002 | |
| RU | 2 066 061 C1 | | 8/1996 | |
| SU | 1468685 A1 | | 1/1987 | |
| SU | 1421474 A1 | | 9/1988 | |

* cited by examiner

RELATED ART

CUTTING TOOL

TECHNICAL FIELD

The present invention relates to a cutting tool, and more particularly to a cutting tool having a screw for finely adjusting a position of a cutting insert fixed to a pocket portion of a tool body.

BACKGROUND ART

Generally, as shown in FIG. 1, at least one cutting insert 2 is fixed to a pocket portion 3 of a cutting tool body 1 using a fastening means (e.g., a bolt) in a cutting tool such as a milling cutter. The milling cutter has a rotational axis RA which defines a front-to-rear axial direction of the cutting tool body 1. As for the cutting insert 2 fixed to the cutting tool body 1, the position of the cutting insert 2 must be adjusted along an adjustment direction Y, which may be along the front-to-rear axial direction to achieve precise cutting and prevent excessive force from being applied to any one of the cutting inserts. To this end, there is provided a device 10 for finely adjusting the position of the cutting insert at a rear portion of the cutting insert 2.

As shown in FIG. 2, in a conventional cutting tool, the cutting insert 2 is fixed to a pocket portion 3 of a tool body using a means such as a bolt (not shown). The device 10 for finely adjusting the position of the cutting insert comprises a wedge 11 and a screw 12. The pocket portion 3 has a bottom surface with a screw hole 3b formed thereon into which the screw 12 is fastened. It also has a side wall with a surface 3a for closely contacting the wedge 11.

The wedge 11 has a larger width as it goes upward. It also has a screw hole at its central portion into which a head portion of the screw 12 is fastened. The screw 12 has threads at its upper and lower portions. The threads formed at the upper portion of the screw 12 are engaged with the threads formed in the screw hole of the wedge 11. The threads formed at the lower portion of the screw 12 are engaged with the threads formed in the screw hole 3b provided at the pocket portion 3.

In the above-described cutting tool, the wedge 11, along with its peripheral side surface 16, moves up and down along the cutting insert 2 and the close contact surface 3a of the pocket portion 3 according to the extent of fastening the screw 12 having central axis C1 while causing the cutting insert 2 to move forward and backward along the adjustment direction Y, thereby finely adjusting the position of the cutting insert 2. For example, when further tightening the screw 12 in a state where the screw 12 is already tightened, the wedge 11 moves down along with the screw 12, thereby finely moving the cutting insert 2 outwardly (i.e., along adjustment direction Y away from the close contact surface 3a). In FIG. 2, the close contact surface 3a forms an obtuse external angle α with adjustment direction Y, in cross-section of the pocket portion 3 containing central axis C1 and the adjustment direction Y.

When applying a pushing force to the cutting insert 2 by using the wedge 11 as described above, a repulsive force F against the pushing force is applied to the wedge since the cutting insert 2 is fastened to the pocket portion 3 of the tool body. As a result, a bending stress is applied at the screw 12. Thus, the screw 12 is resiliently bent towards the close contact surface 3a of the pocket portion 3. In such a case, when removing the cutting insert 2 fixed to the pocket portion 3 to replace or repair the cutting insert 2, the bending stress occurring at the screw 12 is also removed, thereby moving the screw 12 along with the wedge 11 towards the cutting insert 2 (i.e., forward).

When fixing a new cutting insert 2 in a state where the screw 12 and the wedge 11 are moved to a position ahead of their original positions, a problem occurs in that the new cutting insert 2 fails to be mounted in a right position. This is due to an interference of the wedge, which is moved to the position ahead of the original position. Thus, a fine adjustment must be made again after demounting the wedge and mounting the cutting insert.

DISCLOSURE

Technical Problem

Therefore, it is an object of the present invention to provide a cutting tool, which does not require the position of the cutting insert to be readjusted at the time of its replacement, thereby solving the above-described problem of the prior art.

Technical Solution

The present invention provides a cutting tool, comprising: at least one cutting insert; a tool body including a pocket portion to which the cutting insert is mounted; a means for fixing the cutting insert to the pocket portion of the tool body; and a screw for finely adjusting a position of the cutting insert fixed to the pocket portion of the tool body. The screw for performing fine adjustment has a head portion, a threaded portion and a portion for connecting the head portion to the threaded portion. The pocket portion has a bottom surface with a screw hole formed thereon into which the threaded portion is fastened. The pocket portion also has a side wall comprising a surface for closely contacting the head portion of the screw. The screw is configured such that the head portion closely contacts and resiliently pressurizes the close contact surface of the pocket portion when the threaded portion is fastened into the screw hole.

Further, the screw for performing fine adjustment is configured such that the central axis of the head portion and the threaded portion is disposed in the same line when the screw is not fastened into the screw hole of the pocket portion. Furthermore, the screw is configured such that the head portion is pressurized by the close contact surface of the pocket portion. This displaces the central axis of the head portion in a direction opposite to the close contact surface relative to the central axis of the threaded portion when the screw is fastened into the screw hole of the pocket portion.

The head portion of the screw can have a wedge portion and a spiral portion configured to fasten into a screw hole of the wedge portion.

Figure 1:
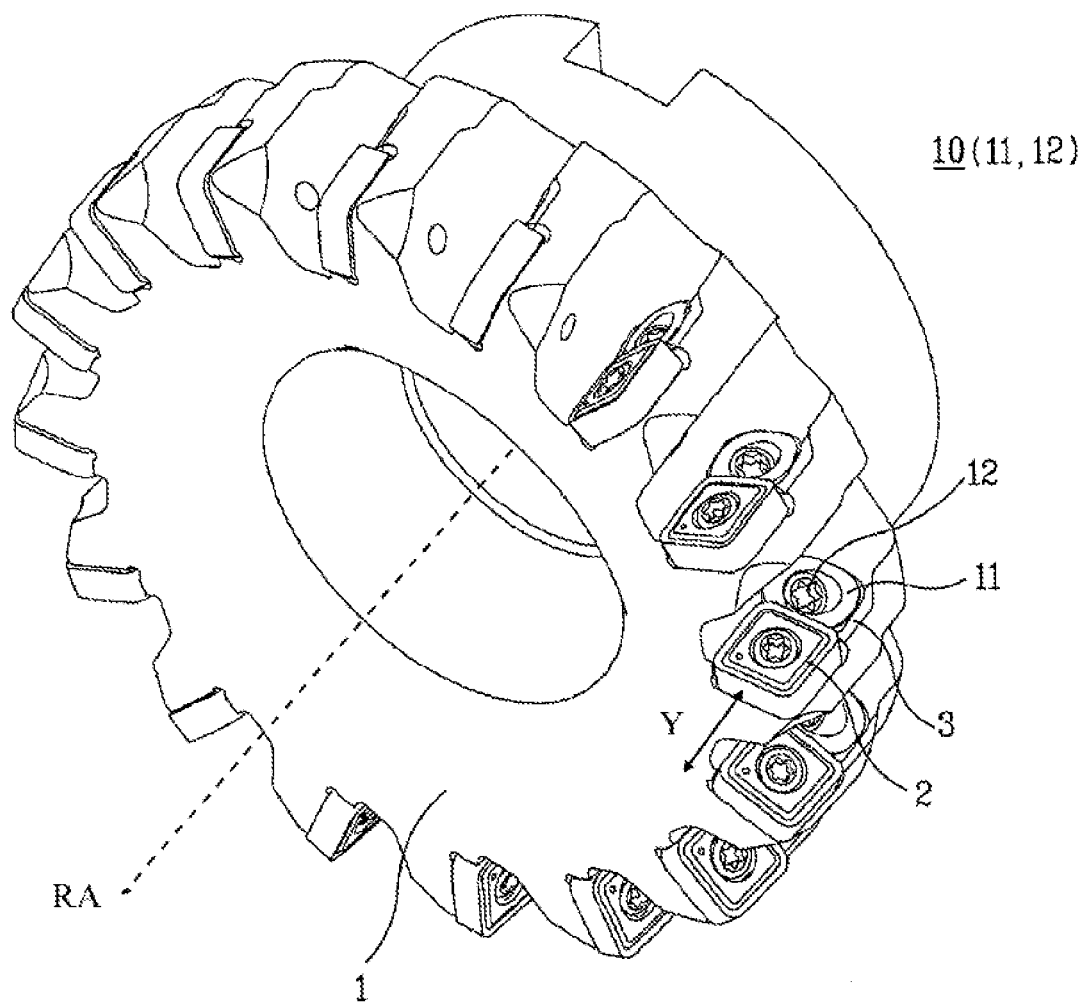
FIG. 1 is a perspective view illustrating the use of a prior art cutting tool.
Figure 2:
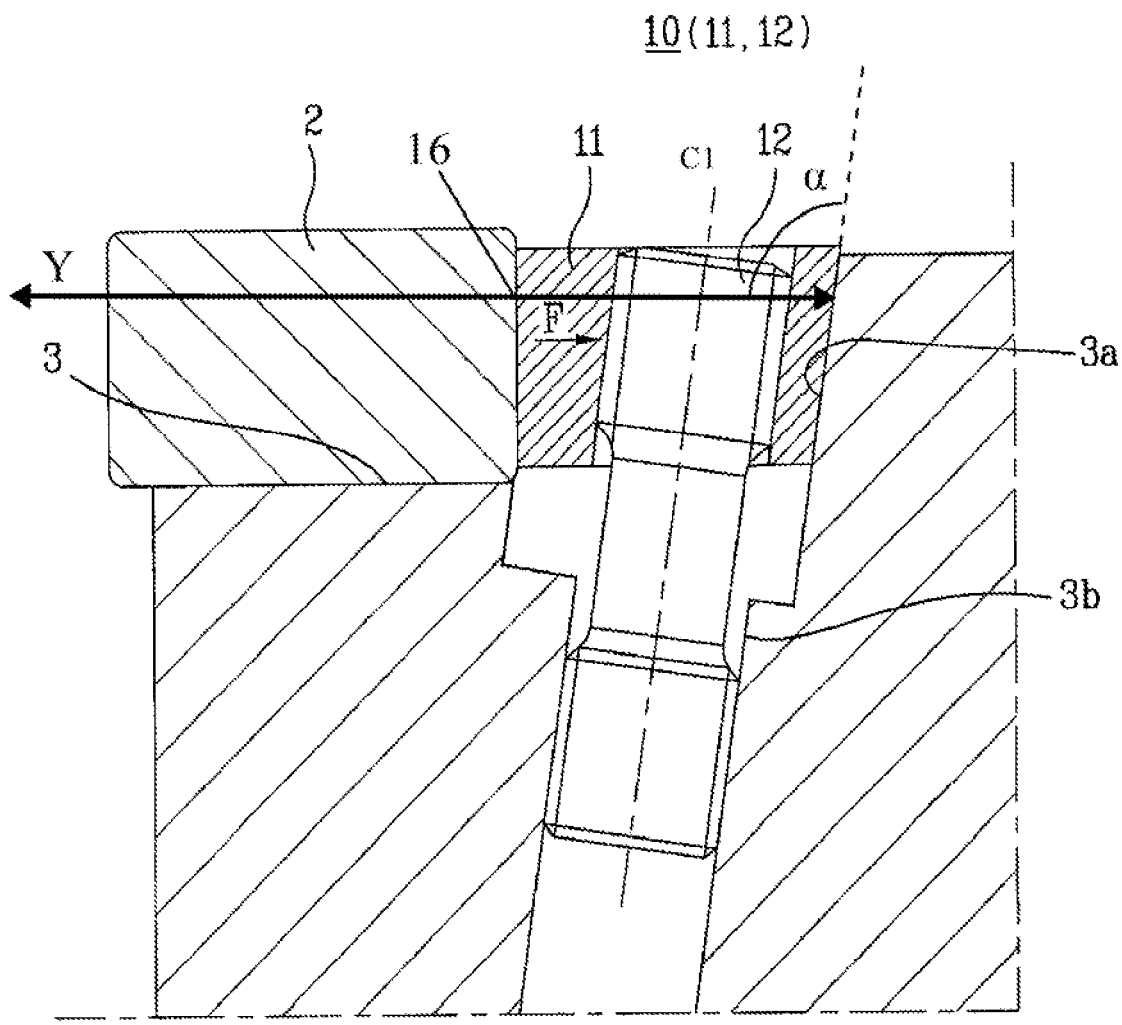
FIG. 2 is a sectional view illustrating the mounting in a prior art cutting tool.

1: tool body
2: cutting insert
3: pocket portion
100: position-adjusting device
110: head portion
110a: wedge portion
110b: spiral portion
111: inclined side
120: threaded portion
130: connecting portion
A: resilient deformation section
B: displacement
C1, C1: central axis
d: diameter of connecting portion
D: diameter of threaded portion

BEST MODE

The features and advantages of the present invention will be more apparent from the following detailed explanations, which will be described with reference to the accompanying drawings.

Hereinafter, to explain the embodiments of the present invention with reference to the drawings, the same reference numerals will be used to denote the same or like elements. Further, for the sake of clarity, different features of the present invention will be described within scopes not overlapping with one another.

Figure 3:
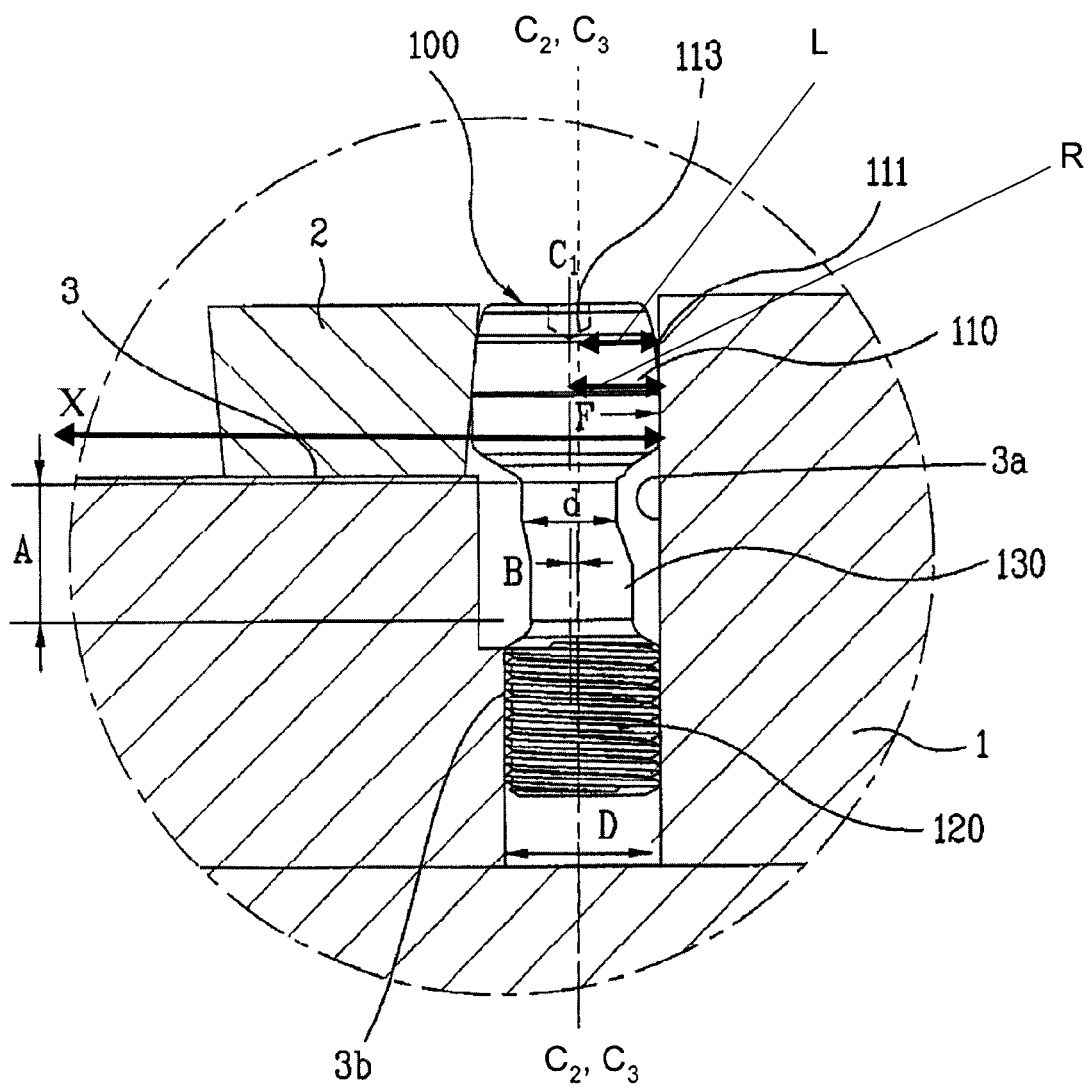
FIG. 3 is a sectional view illustrating the mounting in a cutting tool constructed in accordance with one embodiment of the present invention.
Figure 4:
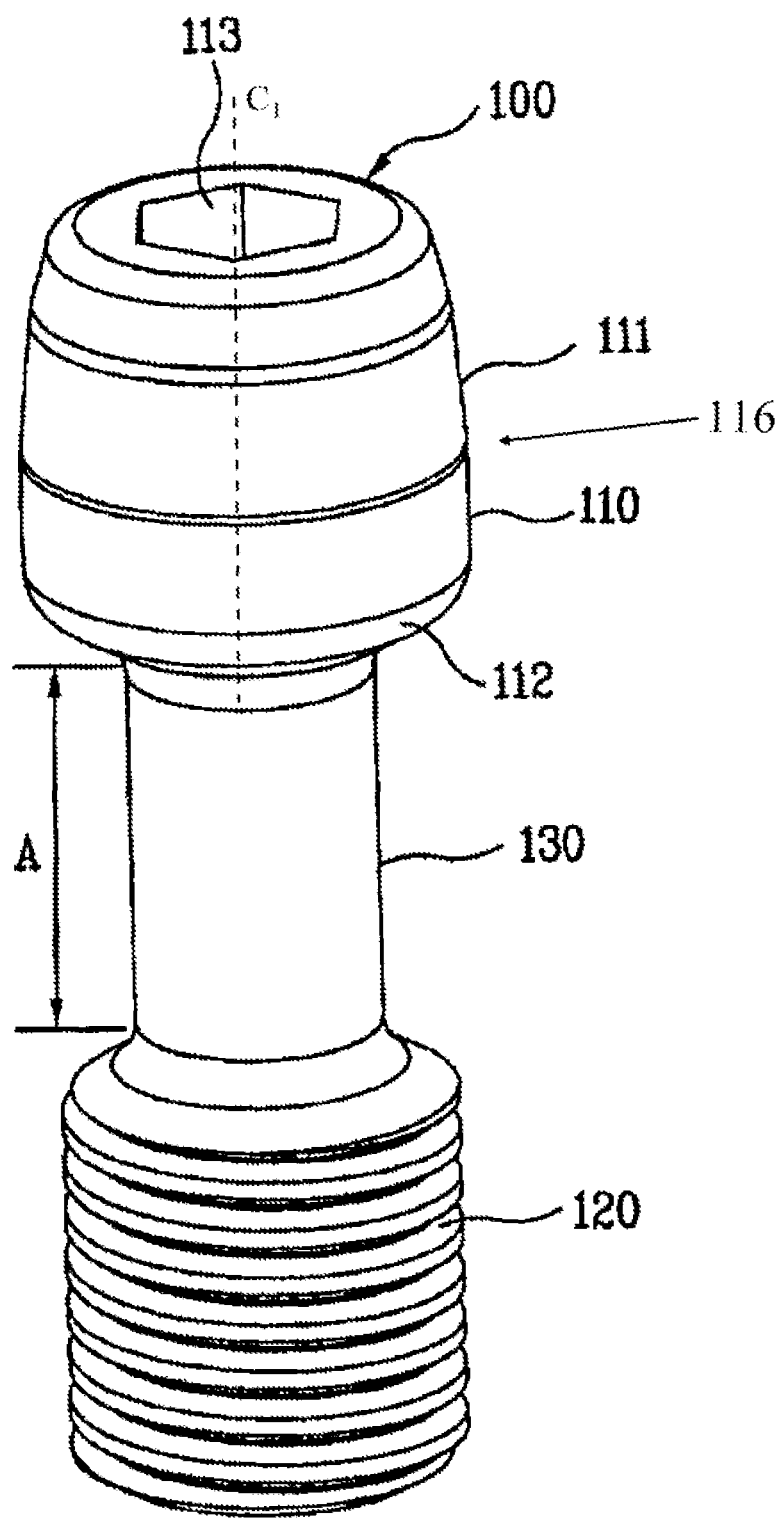
FIG. 4 is a perspective view illustrating a screw for performing fine adjustment in the cutting tool shown in FIG. 3.

As shown in FIGS. 3 and 4, in a cutting tool constructed in accordance with one embodiment of the present invention, a cutting insert 2 is mounted to a pocket portion 3 of a tool body 1 (by any fixing means not shown). In such a state of mounting, the position of the cutting insert 2 is finely adjusted by a screw 100 for performing fine adjustment along adjustment direction X, which in FIG. 3 is perpendicular to the close contact surface 3a.

The screw 100 for performing fine adjustment has a head portion 110, a threaded portion 120 and a connecting portion 130 therebetween. The pocket portion 3 has a bottom surface with a screw hole 3b formed thereon and a side wall comprising a close contact surface 3a. The threaded portion 120 of the screw 100 is fastened into the screw hole 3b of the pocket portion 3. When the screw 100 moves down along the screw hole 3b, the head portion 110 moves down while closely contacting the close contact surface 3a of the pocket portion and the cutting insert 2. This causes a pushing force to be applied to the cutting insert 2 along adjustment direction X away from the close contact surface 3a.

The central axis C1 of the head portion 110 and the central axis C2 of the threaded portion 120 are disposed in the same line when the screw 100 is not fastened to the pocket portion 3. The side wall of the screw hole 3b and the close contact surface 3a of the pocket portion 3 include a portion that lies in the same straight line parallel to the central axis of the screw 100. The head portion 110 may be rotationally symmetric about its central axis C1 and is configured such that a width of its lower portion is larger than that of its upper portion, while a diameter of the widest portion is larger than that of the threaded portion 120. This allows the head portion 110 to function as a wedge. The distance between the close contact surface 3a and a central axis C3 of the screw hole 3b is L, which is less than a maximum radius R of the head portion 110.

Thus, when the head portion 110 is forcibly inserted into a space between the cutting insert 2 and the close contact surface 3a of the pocket portion, the head portion 110 is displaced relative to the central axis C1 of the threaded portion 120 towards the cutting insert 2. That is, the screw 100 is configured such that the head portion 110 and the threaded portion 120 lie in the same central axis when the screw 100 is not fastened to the screw hole 3b of the pocket portion 3. However, the head portion 110 is pushed by the close contact surface 3a of the pocket portion 3 when the screw 100 is fastened to the screw hole 3b of the pocket portion 3. This resiliently displaces the head portion 110 relative to the central axis of the threaded portion 120 in a direction opposite to the close contact surface 3a.

As a result, the force of restituting the head portion 110 towards the close contact surface 3a is applied to the screw 100, in which the head portion 110 in turn pressurizes the close contact surface 3a of the pocket portion. At this time, it is preferable to form a predetermined resilient deformation section A in the connecting portion 130. This is so that such a displacement can be easily achieved and the force of restitution can be effectively applied to the close contact surface 3a. The screw for performing fine adjustment, which includes the connecting portion 130, is generally made from alloy steel (e.g., KS SNCM8, SAE 4340). In such a case, it is preferable to configure the screw 100 such that a diameter d in the resilient deformation section A is 1 mm or more, but smaller than 2/3 of a diameter D of the threaded portion when the diameter D of the threaded portion is 2 mm or more.

If the diameter d of the connecting portion in the resilient deformation section A is 1 mm or less, then the strength in the resilient deformation section A becomes too low. This makes it difficult to provide a proper force of restitution. If the diameter D of the threaded portion is less than 2 mm, then the strength of the threaded portion itself becomes low.

Thus, it is preferable to make the diameter D of the threaded portion 120 larger than 2 mm so that a minimum strength of the threaded portion can be maintained. Further, it is preferable to make the diameter d of the connecting portion in the resilient deformation section A larger than 1 mm, but smaller than 2/3 of the diameter D of the threaded portion. This is so that any plastic deformation or damage due to strong bending stress cannot occur during the resilient deformation.

Meanwhile, if the diameter d of the connecting portion in the resilient deformation section A is larger than 2/3 of the diameter D of the threaded portion 120, then a smooth resilient deformation would not occur when rotating the screw 100 by applying a wrench or the like to a groove 113 of the head portion 110. As a result, the head portion 110 fails to be forcibly inserted. Accordingly, the diameter d of the connecting portion in the resilient deformation section A should not exceed 2/3 of the diameter D of the threaded portion.

It is preferable to make the resilient deformation section A larger than 1.5 times or more as long as the diameter d of the connecting portion. If the total length of the resilient deformation section A is shorter than the length, which is 1.5 times as long as the diameter d of the connecting portion of the resilient deformation section A, then the resilient deformation section A is too short. This causes a plastic deformation rather than a resilient deformation, thereby damaging the resilient deformation section A.

On the other hand, it is preferable that a displacement B of the head portion 110 relative to the central axis C1 of the threaded portion 120 is larger than 0.02 mm, but smaller than 10% of the diameter of the threaded portion. This is because the head portion 110 cannot apply a strong force of restitution to the close contact force 3a of the pocket portion 3 when the displacement B is smaller than 0.02mm. This makes it difficult to achieve a close contact between the head portion 110 and the close contact surface 3a of the pocket portion 3.

Further, if the displacement B is larger than 10% of the diameter of the threaded portion, then the head portion 110 can apply a strong force of restitution to the close contact force 3a of the pocket portion 3. This makes it possible to achieve a close contact between the head portion 110 and the close contact surface 3a of the pocket portion 3. However, due to such a strong contact, an excessively strong fastening force is required for the threaded portion 120, which is not desirable since it becomes very difficult to finely adjust the cutting insert 2.

Referring to an embodiment shown in FIG. 3, the head portion 110 has a peripheral side surface 116 which includes an inclined side 111. Thus, the head portion 110 has a smaller width as it goes upward. Further, the cutting insert 2 is configured such that its width becomes larger as it goes upward. Thus, the screw 100 moves upward as the fastening of the threaded portion 120 is released to thereby move the cutting insert 2 forward. However, when the threaded portion is fastened into the screw hole of the pocket portion in an inclined state, the head portion does not necessarily require an inclined side.

On the other hand, it is preferable that the head portion 110 has an upper end portion with a groove for a driver or a wrench formed thereon in order to facilitate the rotation of the head portion 110 by using a tool such as a driver and a wrench. Further, it is preferable that the entire section of a lower edge 112 of the head portion 110 is chamfered or rounded. This is to facilitate the forceful insertion of the head portion into a space between the cutting insert 2 and the close contact surface 3a of the pocket portion 3.

The use and operation of the device for adjusting the position of the cutting insert of the cutting tool, which is constructed according to the present invention, will be explained below.

First, the threaded portion 120 of the device for adjusting the position of the cutting insert 2 of the present cutting tool 1 is inserted into a space between the cutting insert 2 and the close contact surface 3a of the pocket portion 3. Thereafter, by applying a proper tool such as a driver or a wrench to the groove 113 formed in the upper end portion of the head portion 110, the head portion 110 is rotated in a direction of fastening the threaded portion 120 into the screw hole 3b of the pocket portion 3. This fastens the threaded portion 120 into the screw hole 3b of the pocket portion 3.

When continuing to fasten the threaded portion 120, the head portion 110 interferes with the upper end of the close contact surface 3a of the pocket portion 3 by a predetermined amount. In such a state, when rotating the head portion 110 with a further force, the central axis C1 of the head portion 110 is displaced relative to the central axis C2 of the threaded portion 120 towards the cutting insert 2 by the close contact surface 3a, which lies in the same surface with the side wall of the screw hole 3b. Accordingly, the head portion 110 is forcibly inserted into a space between the cutting insert 2 and the close contact surface 3a of the pocket portion 3. As the head portion is being forcibly inserted, its peripheral side surface 116 rotates about the head portion's central axis C1 while maintaining direct contact with both the cutting insert 2 and the close contact surface 3a.

In such a state, the position of fixing the cutting insert 2 can be easily adjusted. This is done by properly adjusting the forward and backward movement of the cutting insert 2 by the head portion 110 moving up and down between the cutting insert 2 and the close contact surface 3a of the pocket portion 3 according to the extent of fastening the head portion 110. At the same time, the head portion 110 and the close contact surface 3a of the pocket portion 3 can achieve a close contact between them. This is because the close contact surface 3a of the pocket portion 3 is always pushed by a resultant force F comprising a strong force of restitution and a repulsive force of the cutting insert 2. That is, the close contact surface 3a and the head portion 110 apply pressures against each other when the head portion 110 is displaced.

Further, even if the cutting insert 2 is removed from the pocket portion 3 to replace the cutting insert 2, the head portion 110 does not move forward (i.e., towards the cutting insert) since the head portion 110 aggressively pushes the close contact surface 3a of the pocket portion 3. Thus, the position of fixing a new cutting insert 2 for replacement can be always maintained while not changing the position of the cutting insert 2, which is fixed prior to replacement. This can eliminate the work of adjusting the position of the cutting insert 2, which should be conducted whenever the cutting insert 2 is replaced.

Figure 5:
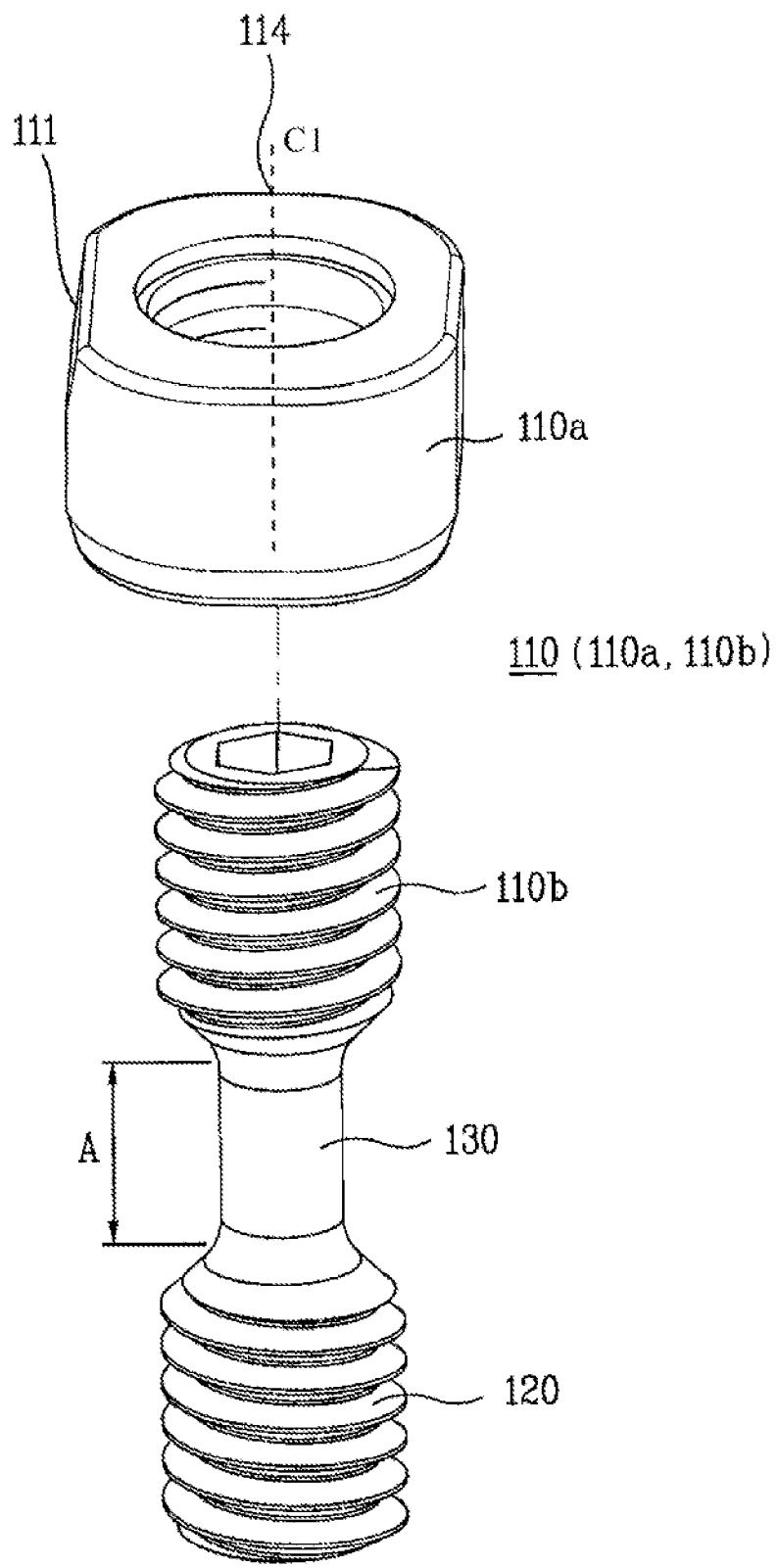
FIG. 5 is an exploded perspective view illustrating a screw for performing fine adjustment in a cutting tool constructed in accordance with another embodiment of the present invention.
Figure 6:
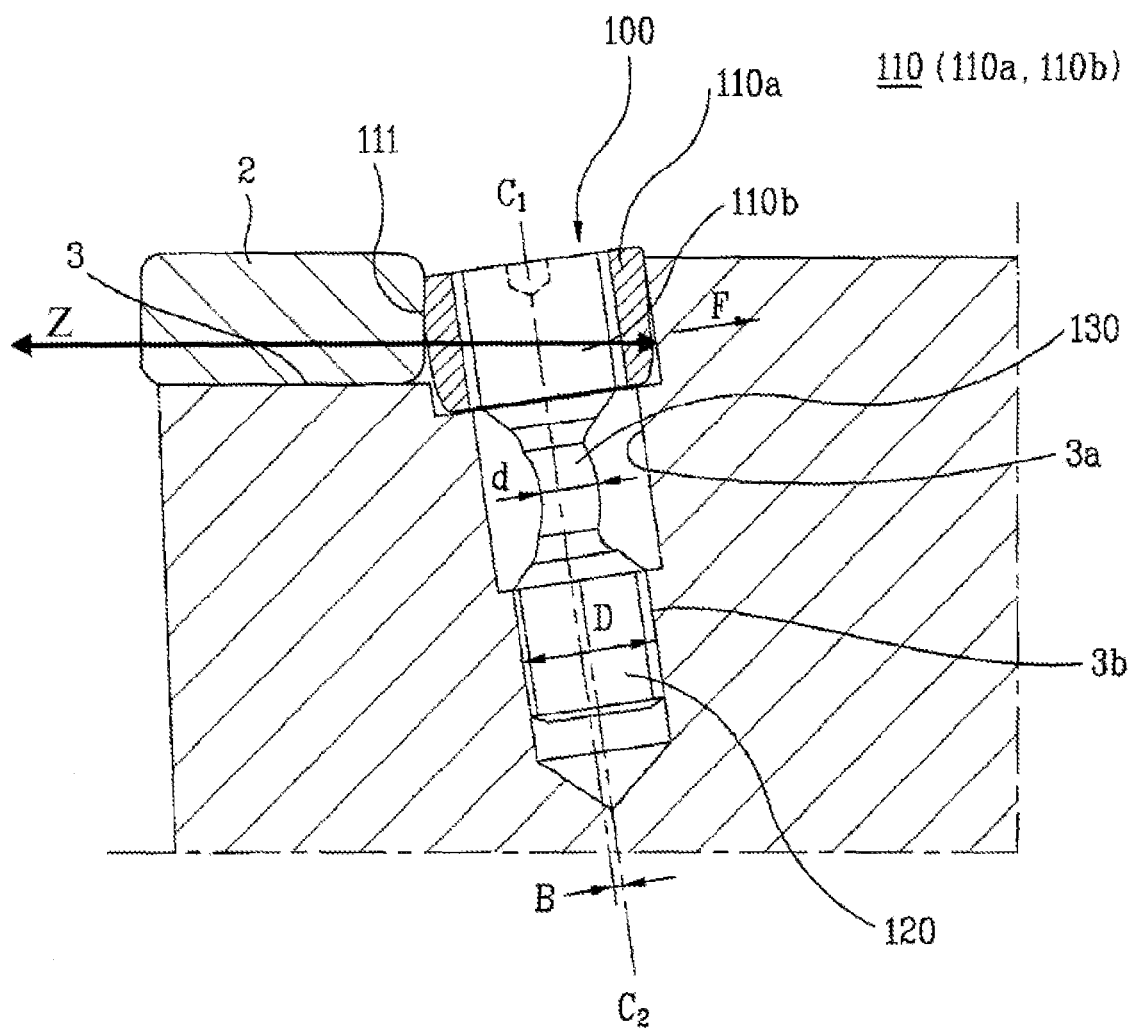
FIG. 6 is a sectional view illustrating the mounting in a cutting tool constructed in accordance with yet another embodiment of the present invention and configured to use the screw shown in FIG. 5.

On the other hand, as another embodiment of the head portion 110 constituting the present invention, which is shown in FIGS. 5 and 6, the head portion 110 can be configured such that it has a wedge portion 110a constituting an outer portion of the head portion 110 and a spiral portion 110b. The spiral portion 110b is fastened into a screw hole of the wedge portion 110a and is connected to the connecting portion 130.

In such a case, the head portion 110a has a central portion with a threaded portion formed therein for combining with the spiral portion 110b. The wedge portion 110a also has a lower end portion with a seating portion (not shown) for seating the spiral portion 110b.

The wedge portion 110a and the spiral portion 110b are fastened through the screw hole to complete an assembly until the spiral portion 110b is seated in a seating portion of the wedge portion 110a. In such a case, it is preferable that the spiral directions of the spiral portion 110b and the threaded portion 120 are opposite to each other in order to facilitate the mounting and demounting of the wedge portion 110a.

In this embodiment, the cutting insert 2 is adjusted along adjustment direction Z, which forms an acute external angle with the close contact surface 3a in cross-section of the pocket portion 3 containing central axis C1 and the adjustment direction Z. As such, when the wedge portion 110 is configured such that it has the wedge portion 110a and the spiral portion 110b, even if a distance between the cutting insert 2 and the close contact surface 3a of the pocket portion in the cutting tool 1 varies, it becomes possible to cope with such a cutting tool 1 by replacing only the wedge portion 110a without requiring a new device for adjusting the position of the cutting insert 2.

While the present invention has been particularly shown and described with reference to exemplary embodiments thereof, it will be understood by those of ordinary skill in the art that various changes in form and details may be made therein without departing from the scope of the present invention as defined by the following claims.

Industrial Applicability

As described above, according to the present invention, the head portion of the screw for performing fine adjustment can closely contact and resiliently pressurize the close contact surface of the pocket portion when the threaded portion of the screw is fastened into the screw hole of the pocket portion.

Thus, even if the cutting insert is removed from the pocket portion for replacement of the cutting insert, the position of fixing a new cutting insert can be always maintained while not changing the position of the cutting insert finely adjusted prior to such replacement. This can eliminate the work of adjusting the position of the cutting insert, which is conducted whenever the cutting insert is replaced.

Further, when the head portion of the screw is configured such that it has the wedge portion and the spiral portion, even if a distance between the cutting insert and the close contact surface of the pocket portion in the cutting tool varies, it becomes possible to cope with such a cutting tool by replacing only the wedge portion without requiring a new device for adjusting the position of the cutting insert.

The invention claimed is:

1. A cutting tool, comprising:
    at least one cutting insert;
    a tool body including a pocket portion to which the cutting insert is mounted;
    a fixing part to fix the cutting insert to the pocket portion of the tool body; and
    a position-adjusting device that finely adjusts a position of the cutting insert fixed to the pocket portion of the tool body, along an adjustment direction (X, Z);
    the position-adjusting device includes a head portion having a central axis (C1) and a peripheral side surface, the head portion located at an outermost axial end of the position- adjusting device, a threaded portion having a diameter D, and a connecting portion connecting the head portion to the threaded portion, the connecting portion having a length A and a diameter d, the length A being longer than the diameter d;
    the pocket portion includes a bottom surface with a screw hole, having a central axis (C3), formed thereon into which the threaded portion is fastened and a side wall including a close contact surface that closely contacts the head portion of the position-adjusting device;
    the close contact surface in cross section being either perpendicular to, or forming an acute external angle with, the adjustment direction (X, Z), and the distance between the close contact surface and a central axis of the screw hole is L, L being less than a maximum radius R of the head portion; and
    the position-adjusting device is configured such that the head portion closely contacts and resiliently presses the close contact surface of the pocket portion such that the head portion interferes with an upper end of the close contact surface when the threaded portion is fastened into the screw hole while the portion connecting the head portion to the threaded portion is resiliently deformed so that the head portion is offset from the threaded portion in a direction opposite to the close contact surface when the threaded portion is fastened into the screw hole, and while the head portion closely contacts and resiliently presses the close contact surface of the pocket portion the offset head portion contacts an outside surface of the cutting insert fixed to the pocket portion that faces the head portion, with the outside surface of the cutting insert fixed to the pocket portion that faces the head portion being only in contact with the head portion, to maintain an adjusted cutting insert position when a cutting insert is replaced;
    wherein the position-adjusting device is configured such that central axes of the head portion and the threaded portion are disposed in the same line when the position- adjusting device is not fastened into the screw hole of the pocket portion;
    wherein the position-adjusting device is configured such that the head portion is pressed by the close contact surface of the pocket portion to thereby displace the head portion in a direction opposite to the close contact surface relative to the central axis of the threaded portion when the position-adjusting device is fastened into the screw hole of the pocket portion; and
    wherein a side wall of the screw hole and the close contact surface include a portion disposed in the same straight line parallel to the central axis of the position-adjusting device, and wherein the head portion of the position-adjusting device includes a portion having a cross-section larger than that of the threaded portion.

2. The cutting tool of claim 1, wherein the head portion includes a wedge portion and a spiral portion fastened into a screw hole of the wedge portion.

3. The cutting tool of claim 1, wherein the cross-section of the connecting portion of the position-adjusting device is smaller than that of both the head portion and the threaded portion.

4. The cutting tool of claim 3, wherein a diameter of the threaded portion is 2mm or more, and wherein a diameter of the connecting portion is 1 mm or more but smaller than $\tfrac{2}{3}$ of the diameter of the threaded portion.

5. The cutting tool of claim 3, wherein the connecting portion is 1.5 times or more as long as the diameter of the connecting portion.

6. The cutting tool of claim 1, wherein the displacement between the head portion and the central axis of the threaded portion is larger than 0.02mm but smaller than 10% of a diameter of the threaded portion.

7. The cutting tool of claim 1, wherein the position-adjusting device is configured such that the head portion is pressed by the close contact surface of the pocket portion to thereby displace the head portion in a direction opposite to the close contact surface relative to a central axis of the threaded portion when the position-adjusting device is fastened into the screw hole of the pocket portion.

8. The cutting tool of claim 1, wherein the cutting insert is detachably mounted to the pocket portion of the tool body and the position-adjusting device is further configured such that the head portion maintains close contact with the close contact surface and resilient pressure on the close contact surface when the cutting insert is detached from the pocket portion of the tool body.

9. The cutting tool of claim 1, wherein the position-adjusting device is made from an alloy steel.

10. The cutting tool of claim 9, wherein the alloy steel is KS SNCM8 or SAE 4340.

11. The cutting tool of claim 1, wherein a top of the fixing part to fix the cutting insert to the pocket portion and a top of the head portion both face toward a top of the cutting insert.

12. The cutting tool of claim 1, wherein the position-adjusting device does not pass through any hole in the cutting insert.

13. The cutting tool of claim 1, wherein a width of the head portion increases going from a top of the head portion toward a bottom of the head portion.

14. The cutting tool of claim 13, wherein the outside surface of the cutting insert fixed to the pocket portion that faces the head portion is angled toward the head portion.

15. A cutting tool, comprising:
    at least one cutting insert;
    a tool body including a pocket portion to which the cutting insert is mounted;
    a fixing part to fix the cutting insert to the pocket portion of the tool body; and a position-adjusting device that finely adjusts a position of the cutting insert fixed to the pocket portion of the tool body, along an adjustment direction (X, Z);

the position-adjusting device includes a head portion having a central axis (C1) and a peripheral side surface, the head portion located at an outermost axial end of the position- adjusting device, a threaded portion having a diameter D, and a connecting portion connecting the head portion to the threaded portion, the connecting portion having a length A and a diameter d, the length A being longer than the diameter d;

the pocket portion includes a bottom surface with a screw hole formed thereon into which the threaded portion is fastened and a side wall including a close contact surface that closely contacts the head portion of the position-adjusting device; and the position-adjusting device is configured such that the head portion closely contacts and resiliently presses the close contact surface of the pocket portion such that the head portion interferes with an upper end of the close contact surface when the threaded portion is fastened into the screw hole while the portion connecting the head portion to the threaded portion is resiliently deformed so that the head portion is offset from the threaded portion in a direction opposite to the close contact surface when the threaded portion is fastened into the screw hole, and while the head portion closely contacts and resiliently presses the close contact surface of the pocket portion the offset head portion contacts an outside surface of the cutting insert fixed to the pocket portion that faces the head portion, with the outside surface of the cutting insert fixed to the pocket portion that faces the head portion being only in contact with the head portion, to maintain an adjusted cutting insert position when a cutting insert is replaced;

wherein an entirety of the position-adjusting device is rotatable to fasten the threaded portion into the screw hole, such that the peripheral side surface of the head portion rotates about the central axis (C1) while maintaining direct contact with both the cutting insert and the close contact surface; and wherein a side wall of the screw hole and the close contact surface include a portion disposed in the same straight line parallel to the central axis of the position-adjusting device, and wherein the head portion of the position-adjusting device includes a portion having a cross-section larger than that of the threaded portion.

* * * * *